C. C. BLACKMORE.
ANTIRATTLING DEVICE FOR AUTOMOBILE DOORS AND THE LIKE.
APPLICATION FILED NOV. 22, 1920.
1,384,506.
Patented July 12, 1921.
2 SHEETS—SHEET 1.
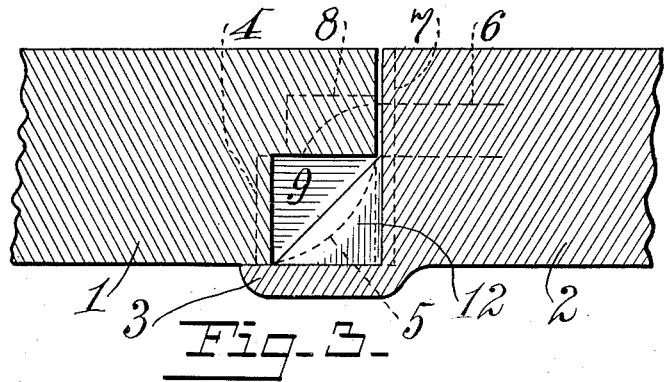
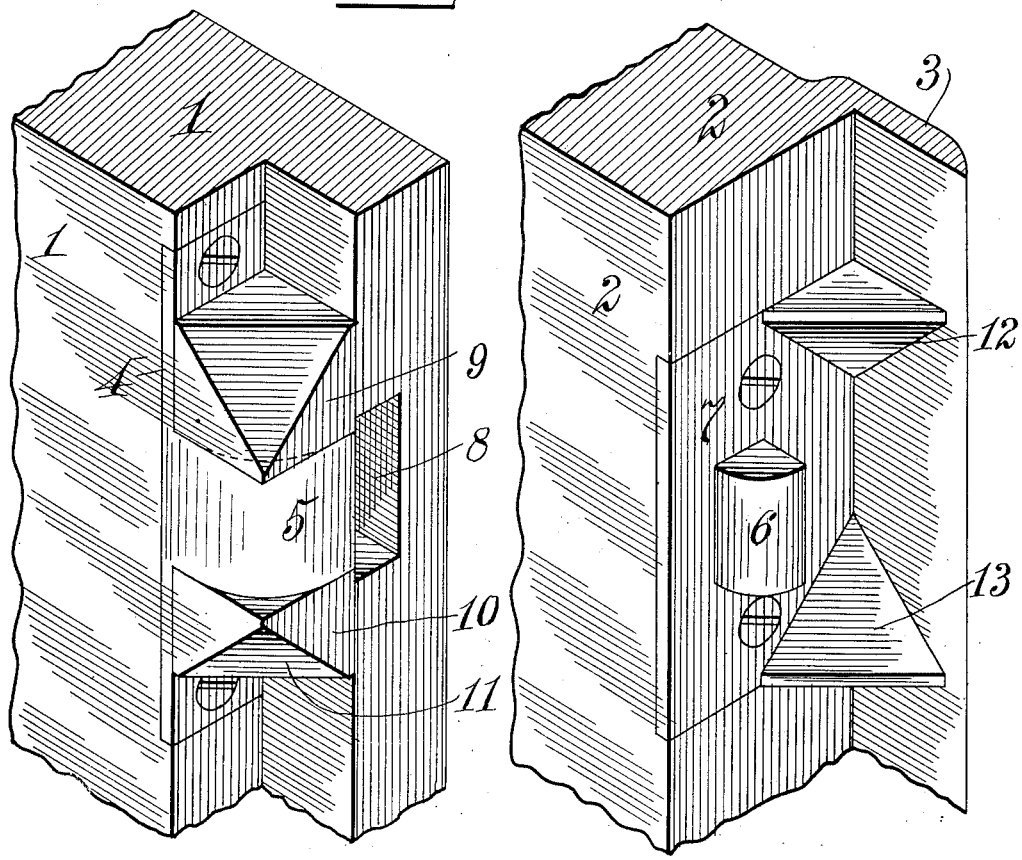
Inventor
C. C. BLACKMORE.
By Edward Reed
Attorney C. C. BLACKMORE.
ANTIRATTLING DEVICE FOR AUTOMOBILE DOORS AND THE LIKE.
APPLICATION FILED NOV. 22, 1920.
1,384,506.
Patented July 12, 1921.
2 SHEETS—SHEET 2.
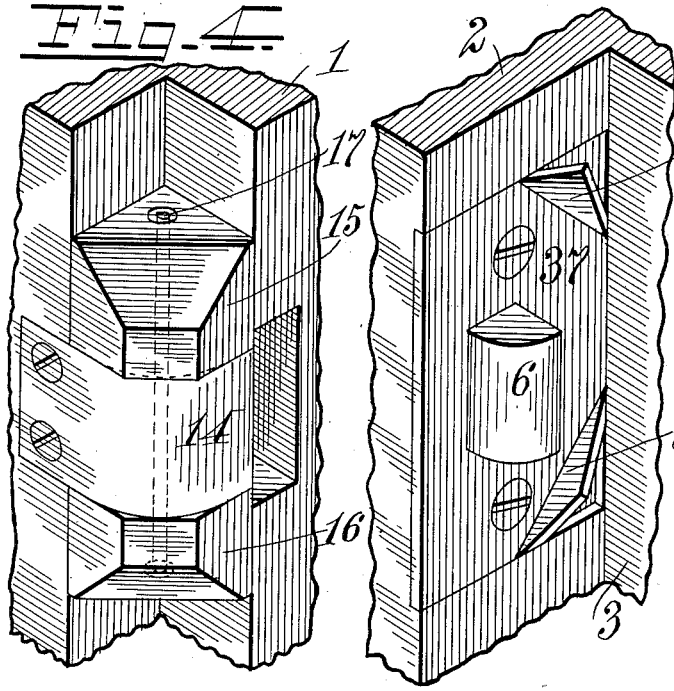
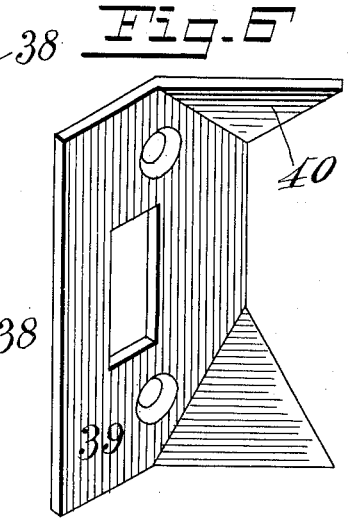
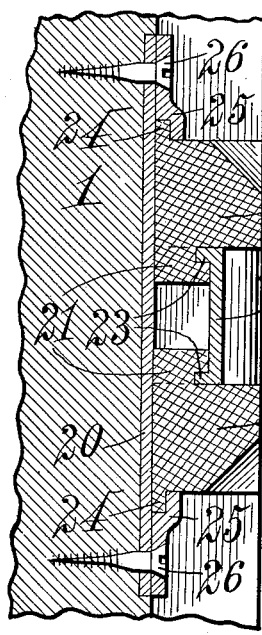
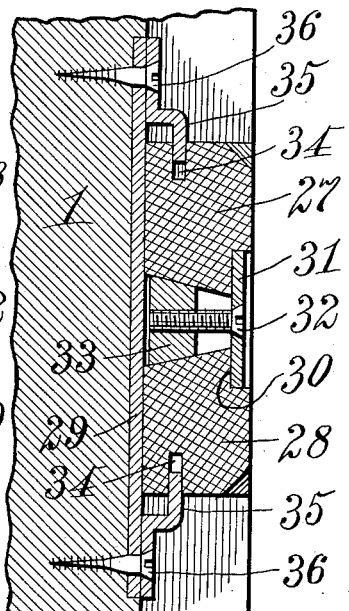
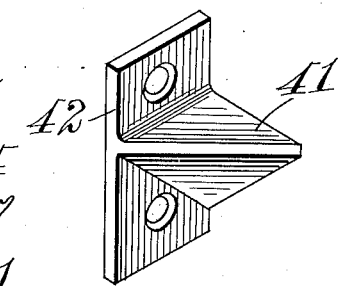
Inventor
C. C. BLACKMORE.
By
Attorney though it were a single piece.
UNITED STATES PATENT OFFICE.

CHARLES C. BLACKMORE, OF DAYTON, OHIO.

ANTIRATTLING DEVICE FOR AUTOMOBILE-DOORS AND THE LIKE.

1,384,506.

Specification of Letters Patent.

Patented July 12, 1921.

Application filed November 22, 1920. Serial No. 425,662.

*To all whom it may concern:*

Be it known that I, CHARLES C. BLACKMORE, a citizen of the United States, residing at Dayton, in the county of Montgomery and State of Ohio, have invented certain new and useful Improvements in Antirattling Devices for Automobile-Doors and the like, of which the following is a specification, reference being had therein to the accompanying drawing.

This invention relates to antirattling devices for automobile doors and the like.

The object of the invention is to provide a simple, inexpensive device which will operate efficiently to prevent either vertical or horizontal vibration of an automobile door, or the like, thereby preventing the same from rattling.

A further object of the invention is to provide such a device which may be carried by the members of the door latch and thus applied to the door simultaneously with the latch, thereby facilitating the application of the invention to the door and saving the time and labor which would otherwise be necessary to apply and properly aline the antirattling device.

Other objects of the invention will appear as the device is described in detail.

In the accompanying drawing Figure 1 is a perspective view of a portion of the door frame of an automobile showing the invention applied thereto; Fig. 2 is a perspective view of a portion of the door of an automobile showing the invention applied thereto; Fig. 3 is a horizontal sectional view of an automobile door and door frame taken just above the latch, showing the invention applied thereto; Fig. 4 is a perspective view of a portion of a door frame showing a slightly modified form of the invention; Fig. 5 is a perspective view of a portion of the door showing a latch casing modified to embody a part of the invention therein; Fig. 6 is a detail view of the face plate of a door latch showing the same provided with abutments; Fig. 7 is a sectional view of a portion of a door frame and latch plate showing one manner of attaching the abutments thereto; Fig. 8 is a similar view showing another method of attaching the abutments thereto; and Fig. 9 is a detail view of a modified form of the abutments for the door.

In carrying out my invention I mount on the door two abutments which are preferably arranged on the opposite sides of the keeper of the latch and are each provided with inclined, or oblique contact surfaces, the contact surfaces of the two abutments being inclined in opposite directions. On the door I mount a second pair of abutments arranged on opposite sides of the bolt of the latch and having inclined, or oblique, contact surfaces to engage the contact surfaces of the first pair of abutments when the door is closed. One pair of the abutments is yieldable so that it will be placed under pressure when the door is closed, thereby holding the door against all vibration. I have, in the present drawings, shown several different embodiments of my invention, but it will be understood that these have been chosen for the purposes of illustration only and that the invention may take various forms and may be applied to doors of various kinds.

In Figs. 1, 2 and 3 I have shown the invention as applied to an automobile, the door frame of which is shown at 1 and the door at 2, the door being provided with the usual flange, or bead, 3 which overlaps the door frame. Mounted on the door in the usual manner is a latch plate 4 to which is secured an inclined, or curved, keeper plate 5 adapted to be engaged by and to retract the bolt 6 of the latch, which is slidably mounted i a casing on the door, the face plate of which is shown at 7. When the bolt of the latch passes the contact face of the keeper, or striker plate, it will enter a recess 8 and engage the edge of that plate so as to hold the door in its closed position. Mounted on the door frame on opposite sides of the keeper, or striker plate, 5 are two abutments 9 and 10 which are preferably, but not necessarily, secured to the latch plate 4 so that they will be placed in position by the installation of the latch. These abutments are each provided with a contact surface 11 which extends obliquely both to a horizontal plane and to a vertical plane parallel with the door frame. These abutments are preferably yieldable and, in the present construction, they are formed of blocks of soft rubber which may be secured in position in any suitable manner. As here shown, the two blocks, or abutments, 9 and 10, are connected one to the other by forming them in a single piece and an intermediate portion is reduced in thickness so that it may be placed back of the keeper, or striker plate, 5 and held in position by that plate. These blocks of soft rubber have those outer corners which are remote from the keeper plate cut away to provide the inclined, or oblique, contact surfaces. The latch casing, which is mounted on the door, is also provided with a pair of abutments, as shown at 12 and 13 and these abutments are preferably secured to the face plate 7 of the latch casing, on opposite sides of the bolt 6. They are provided with inclined, or oblique, contact surfaces so arranged that when the door is closed these surfaces will engage, and will lie substantially parallel to, the contact surfaces 11 of the abutments 9 and 10 on the door frame. The relative positions of the two pairs of abutments are such that when the door has been closed so that the bolt 6 will engage back of the keeper, or striker plate, 5, the yieldable abutments will have been compressed and will thus exert pressure on the abutments carried by the door, which are preferably rigidly mounted. Because of the angularity of the contact surfaces of both pairs of abutments, the contact between them is of a wedging character and will not only serve to prevent vertical vibration of the door but will also prevent horizontal vibration of the door in a direction either transversely to or parallel with the plane of the door and will thereby prevent all vibration, or rattling, of the door.

In Fig. 4 I have shown a slightly different form of the yieldable abutments and have shown the same as applied in connection with a latch in which the latch plate 4 is omitted and the keeper, or striker plate, which is shown at 14, is secured directly to the door frame. In this form of the device the two abutments 15 and 16 lie snugly against the side walls of the keeper and are rigidly connected one to the other by a rod 17 extending through the same and through the side walls of the striker plate. In this form of the device I have also cut away the outer end, or points, of the abutments to prevent the same being forced across the striker plate by contact with the abutments on the door.

In Fig. 7 I have shown the yieldable abutments, 18 and 19, as mounted on a latch plate 20 but as formed separate one from the other. Each of these abutments has an inwardly extending portion 21 which projects beneath the striker plate 22 and is provided with a groove to receive a flange, or lip, 23, carried by the striker plate. The outer edges of the abutments have reduced portions or lips, 24, which are engaged by clamping plates 25 adapted to be secured to the latch plate 20 by the screws 26 used to attach the latch plate to the door frame 1.

In Fig. 8 the yieldable abutments, which are shown at 27 and 28, are also formed separate one from the other and are mounted on the latch plate 29. In this instance the inner, or adjacent edges of the abutments are inclined so that they converge away from the latch plate 29 and they are provided with shoulders 30 on which rests the striker plate 31, which is connected by a screw 32 with a tapered, or wedge-shaped, block 33 arranged between the converging faces of the abutments, thus serving to connect the two abutments one to the other. By tightening the screw 32 the wedge-shaped block, or spacer, 33 will be drawn toward the plate 31, thus separating the two abutments to compensate for the wear on the contact faces thereof. Each abutment is provided in its end portion with a slot 34 into which extends a clamping plate 35 which is attached to the latch plate 29 by the screw 36 by means of which that plate is attached to the door frame 1. The recesses 34 are of such a depth that the clamping plates 35 will not engage the inner edges thereof until the abutments have been separated to the greatest extent possible by the action of the wedge shaped spacing device 33.

The pair of abutments which is carried by the door may be mounted in various ways and, as shown in Fig. 5, I have formed them by bending outwardly the rear corners of the face plate 37 of the latch casing, as shown at 38. This plate, however, is usually rectangular and it is not practical to bend out a sufficiently large portion of the plate to form abutments having contact faces of the same area as the abutments on the door frame. While it is not necessary that the contact faces should be of the same area they may be so provided, if desired, by providing the latch with a face plate 39 of special shape so that when the rear corners are bent upwardly, as shown at 40, they will have much larger areas than have the corners of the rectangular plate. It is not necessary, however, that the abutments on the door should be a part of the latch, but they may be formed separately therefrom, as shown at 41 in Fig. 9, where the abutment is carried by a separate plate 42 which may be secured to the door either in connection with the latch casing or independently thereof.

It will be apparent, therefore, that I have provided an anti-rattling device which is not only very simple in its construction and very efficient in its operation, but which may be produced at a low cost and which can be applied to the door simultaneously with the application of the latch thereto, thereby very greatly reducing the cost of installation.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a device of the character described, a pair of abutments adapted to be mounted on a door frame on opposite sides of the keeper of a latch and each having an oblique contact surface, a second pair of abutments adapted to be mounted on a door on opposite sides of the bolt of said latch and each having an oblique contact surface arranged to engage the contact surface of the corresponding abutment of the first mentioned pair when said door is in its closed position, the abutments of one pair being yieldable.

2. In a device of the character described, a pair of abutments adapted to be mounted on a door frame on opposite sides of the keeper of a latch and each having an oblique contact surface, a second pair of abutments adapted to be mounted on a door on opposite sides of the bolt of said latch and each having an oblique contact surface arranged to engage the contact surface of the corresponding abutment of the first mentioned pair when said door is in its closed position.

3. In a device of the character described, a pair of abutments adapted to be mounted on a door frame on opposite sides of the keeper of a latch and each having a contact surface extending obliquely both to a horizontal plane and to a vertical plane parallel with the door frame, a second pair of abutments adapted to be mounted on a door on opposite sides of the bolt of said latch and each having an oblique contact surface arranged to engage the contact surface of the corresponding abutment of the first mentioned pair when said door is in its closed position, the abutments of one pair being yieldable.

4. In a device of the character described, a pair of yieldable abutments adapted to be mounted on a door frame on opposite sides of the keeper of a latch and each having an oblique contact surface, a latch casing adapted to be mounted on a door, and a face plate for said casing having two of its corners turned outwardly at an angle to the face thereof to form oblique contact surfaces arranged to engage the respective contact surfaces of the abutments on said door frame.

5. In a device of the character described, a pair of abutments of resilient material spaced apart and having portions extending one toward the other, a striker plate adapted to be secured to a door frame and to overlap said portions of said abutments to secure the same to said door frame, and other abutments adapted to be secured to a door in such positions that they will engage the respective first mentioned abutments when said door is closed.

6. In a device of the character described, a pair of separately formed abutments each having a portion extending toward the other, a striker plate adapted to be secured to a door frame and to extend between the two abutments and to overlap said portions thereof, said abutments also having projections at their outer ends, clamping plates to overlap said projections and adapted to be secured to said door frame, and other abutments adapted to be mounted on a door in such positions that they will engage the first mentioned abutments when the door is moved to its closed position.

7. In a device of the character described, a pair of abutments spaced one from the other and having their adjacent walls converging, a striker plate adapted to be secured to a door frame and overlapping the adjacent edges of said abutments, a tapered block interposed between the converging edges of said abutments, a screw extending through said striker plate and threaded into said tapered block, clamping plates engaging end portions of the respective abutments and adapted to be secured to said door frame, other abutments adapted to be carried by a door and arranged to engage the first mentioned abutments when said door is closed.

8. In a device of the character described, a pair of abutments adapted to be mounted on a door frame and having their adjacent edges converging away from said door frame, a striker plate overlapping the adjacent edges of said abutments, attaching devices for securing the outer ends of said abutments to said door frame, each of said abutments having an inclined contact surface at that end thereof remote from said striker plate, other abutments adapted to be carried by the door and arranged to engage said inclined contact surfaces when said door is in its closed position, and means to adjust the first mentioned abutments to compensate for the wear thereon.

In testimony whereof I affix my signature hereto.

CHARLES C. BLACKMORE.